US012805509B2

(12) United States Patent
Batz-Alvarado et al.

(10) Patent No.: US 12,805,509 B2
(45) Date of Patent: Nov. 24, 2026

(54) SYSTEM FOR INDEXING SECTIONS OF NOZZLES ON AN AGRICULTURAL SPRAYER

(71) Applicant: CNH Industrial America LLC, New Holland, PA (US)

(72) Inventors: Jose Batz-Alvarado, Lyons, IL (US); Steven Winkel, Elkhart Lake, WI (US); Nathan Paul Brooks, Manitowoc, WI (US)

(73) Assignee: CNH Industrial America LLC, New Holland, PA (US)

( * ) Notice: Subject to any disclaimer, the term of this patent is extended or adjusted under 35 U.S.C. 154(b) by 510 days.

(21) Appl. No.: 18/452,851

(22) Filed: Aug. 21, 2023

(65) Prior Publication Data

US 2025/0064044 A1 Feb. 27, 2025

(51) Int. Cl.
*A01M 7/00* (2006.01)

(52) U.S. Cl.
CPC ........ *A01M 7/0089* (2013.01); *A01M 7/0042* (2013.01)

(58) Field of Classification Search
CPC .......................... A01M 7/0089; A01M 7/0042
See application file for complete search history.

(56) References Cited

U.S. PATENT DOCUMENTS 5,833,010 A 11/1998 Scott et al.
6,776,355 B2 8/2004 Ringer et al.
8,028,927 B2 10/2011 Ward et al.
2006/0224945 A1* 10/2006 Khan .................... G06F 3/0235 715/201
2010/0204657 A1* 8/2010 Yodfat .................. A61M 5/168 604/246

(Continued)

FOREIGN PATENT DOCUMENTS

BR 102018072836 A2 6/2019
DE 4138213 A1 5/1993

OTHER PUBLICATIONS

Croplands, HV4000 Sprayer Console V1.5.6, HV4000 Operators Manual, 74 Pages. Retrieved Aug. 21, 2023 from webpage https://croplands.com/au/wpcontent/uploads/sites/5/2021/04/HV4000-Operators-Manual.pdf.

(Continued)

*Primary Examiner* — Kamini S Shah
*Assistant Examiner* — Michael V Farina
(74) *Attorney, Agent, or Firm* — Dority & Manning, P.A.

(57) ABSTRACT

Upon receipt of a first operator input, a computing system is configured to one of sequentially turn on or turn off a first plurality of sections of nozzles supported on a first boom arm of an agricultural sprayer. Furthermore, upon receipt of a second operator input, the computing system is configured to one of sequentially turn on or turn off a second plurality of sections of nozzles supported on a second boom arm of the sprayer. Additionally, upon simultaneous receipt of first and third operator inputs, the computing system is configured to the other of sequentially turn on or turn off the first plurality of sections of nozzles. Moreover, upon simultaneous receipt of second and third operator inputs, the computing system is configured to the other of sequentially turn on or turn off the second plurality of sections of nozzles.

18 Claims, 5 Drawing Sheets

(56) References Cited

U.S. PATENT DOCUMENTS

| | | | | |
|---|---|---|---|---|
| 2014/0042831 | A1* | 2/2014 | DiLuciano | B60L 3/08 307/328 |
| 2016/0309647 | A1* | 10/2016 | Bittner | A01M 7/0089 |
| 2016/0310978 | A1 | 10/2016 | Bittner et al. | |
| 2016/0338335 | A1* | 11/2016 | Hammer | B05B 13/005 |
| 2017/0357400 | A1* | 12/2017 | Foster | G05D 1/0278 |

OTHER PUBLICATIONS

John Deere, 800 and 800i Series Trailed Sprayers, 28 Pages. Retrieved Aug. 21, 2023 from https://www.farminguk.com/content/knowledge/800-800i.pdf.

John Deere, John Deere 4940 Self-Propelled Sprayers Diagnosis and Tests Service Manual (TM113519), 75 pages. Retrieved Aug. 21, 2023 from webpage: https://aplusmanual.com/1804/john-deere-4940-self-propelled-sprayers-diagnosis-and-tests-service-manual-tm113519.

Snow Ex, Liqui Maxx Sprayer Systems, Owner's Manual and Installation Instructions, Lit No. 76348, Rev. 02, Aug. 2017, 40 pages. Retrieved Aug. 21, 2023 from webpage: https://library.snowexproducts.com/snowexproducts/pdffiles/76348.02_081517.pdf.

* cited by examiner

SYSTEM FOR INDEXING SECTIONS OF NOZZLES ON AN AGRICULTURAL SPRAYER

FIELD OF THE INVENTION

The present disclosure generally relates to agricultural sprayers and, more particularly, to systems for indexing sections of nozzles on an agricultural sprayer.

BACKGROUND OF THE INVENTION

Agricultural sprayers apply an agricultural fluid (e.g., a pesticide, a nutrient, and/or the like) onto a field across which the sprayer is traveling. As such, a typical sprayer includes a boom assembly on which a plurality of spaced apart nozzles is mounted. Each nozzle is, in turn, configured to dispense or otherwise spray the agricultural fluid onto the underlying plants (e.g., crops, weeds, etc.) and/or soil.

During a spraying operation, it may be necessary to turn sections of the nozzles on the boom assembly on and off to control the lateral width of the swath of the field being sprayed. This is known as indexing. For example, in certain instances, a portion of the swath of the field currently being sprayed may begin to partially overlap with a portion of the field that has already been sprayed. In such instances, the operator of the sprayer may turn off one or more sections of nozzles. This, in turn, reduces the lateral width of the swath of the field currently being sprayed, thereby avoiding over-application of the agricultural fluid to such overlapping portions of the field. Furthermore, as the spraying operation continues and sprayer moves past such overlapping portions of the field, the operator of the sprayer may turn section(s) of nozzles back on to avoid underapplication of the agricultural fluid other portions of the field.

In this respect, systems for indexing sections of nozzles on an agricultural sprayer have been developed. While such systems work well, further improvements are needed. For example, many conventional systems rely on numerous input devices to control indexing of the sprayer. However, numerous input devices for controlling indexing reduce the available space on the user interfaces of the sprayer for other input devices to allow the operator to control other functions of the sprayer.

Accordingly, an improved system for indexing sections of nozzles on an agricultural sprayer would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural sprayer. Specifically, the agricultural sprayer includes a frame, a first boom arm supported on the frame, a first plurality of sections of nozzles supported on the first boom arm, and a first plurality of valves configured to control a flow of agricultural fluid to the first plurality of sections of nozzles. Furthermore, the agricultural sprayer includes a second boom arm supported on the frame, a second plurality of sections of nozzles supported on the second boom arm, and a second plurality of valves configured to control the flow of the agricultural fluid to the second plurality of sections of nozzles. Additionally, the agricultural sprayer includes a user interface having a first input device, a second input device, and a third input device. Moreover, the agricultural sprayer includes a computing system communicatively coupled to the user interface. In this respect, the computing system is configured to receive a first operator input from the first input device and, upon receipt of the first operator input, control an operation of the first plurality of valves to one of sequentially turn on or turn off the first plurality of sections of nozzles. In addition, the computing system is configured to receive a second operator input from the second input device and, upon receipt of the second operator input, control an operation of the second plurality of valves to one of sequentially turn on or turn off the second plurality of sections of nozzles. Furthermore, the computing system is configured to simultaneously receive the first operator input from the first input device and a third input from the third input device and, upon simultaneous receipt of the first and third operator inputs, control the operation of the first plurality of valves to the other of sequentially turn on or turn off the first plurality of sections of nozzles. Additionally, the computing system is configured to simultaneously receive the second operator input from the second input device and the third input from the third input device and, upon simultaneous receipt of the second and third operator inputs, control the operation of the second plurality of valves to the other of sequentially turn on or turn off the second plurality of sections of nozzles.

In another aspect, the present subject matter is directed to a system for indexing sections of nozzles on an agricultural sprayer. The system includes a first boom arm, a first plurality of sections of nozzles supported on the first boom arm, and a first plurality of valves configured to control a flow of agricultural fluid to the first plurality of sections of nozzles. Furthermore, the agricultural sprayer includes a second boom arm, a second plurality of sections of nozzles supported on the second boom arm, and a second plurality of valves configured to control the flow of the agricultural fluid to the second plurality of sections of nozzles. Additionally, the agricultural sprayer includes a user interface having a first input device, a second input device, and a third input device. Moreover, the agricultural sprayer includes a computing system communicatively coupled to the user interface. In this respect, the computing system is configured to receive a first operator input from the first input device and, upon receipt of the first operator input, control an operation of the first plurality of valves to one of sequentially turn on or turn off the first plurality of sections of nozzles. In addition, the computing system is configured to receive a second operator input from the second input device and, upon receipt of the second operator input, control an operation of the second plurality of valves to one of sequentially turn on or turn off the second plurality of sections of nozzles. Furthermore, the computing system is configured to simultaneously receive the first operator input from the first input device and a third input from the third input device and, upon simultaneous receipt of the first and third operator inputs, control the operation of the first plurality of valves to the other of sequentially turn on or turn off the first plurality of sections of nozzles. Additionally, the computing system is configured to simultaneously receive the second operator input from the second input device and the third input from the third input device and, upon simultaneous receipt of the second and third operator inputs, control the operation of the second plurality of valves to the other of sequentially turn on or turn off the second plurality of sections of nozzles.

These and other features, aspects and advantages of the present technology will become better understood with reference to the following description and appended claims.

The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
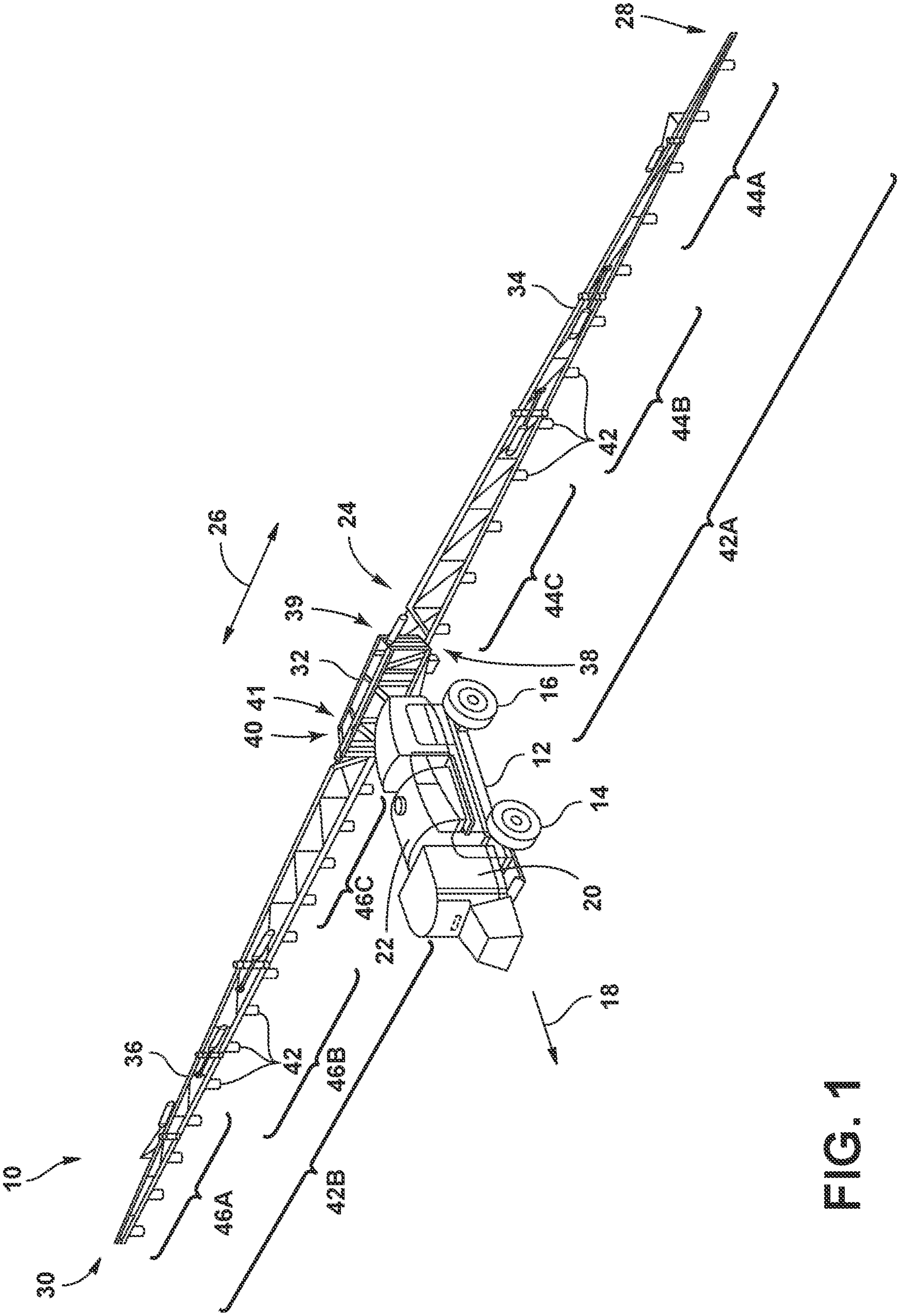
FIG. 1 illustrates a perspective view of one embodiment of an agricultural sprayer in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to a system for indexing sections of nozzles on an agricultural sprayer. As will be described below, the agricultural sprayer includes a first boom arm having a first plurality of sections of nozzles supported thereon. In this respect, the agricultural sprayer includes a first plurality of valves configured to control the flow of agricultural fluid to the first plurality of sections of nozzles. Furthermore, the agricultural sprayer includes a second boom arm having a second plurality of sections of nozzles supported thereon. As such, the agricultural sprayer includes a second plurality of valves configured to control the flow of the agricultural fluid to the second plurality of sections of nozzles.

The disclosed system includes a user interface for controlling the operation of the agricultural sprayer. Specifically, in some embodiments, the user interface may be configured as a multi-function handle positioned within the cab of the agricultural sprayer. Moreover, the user interface includes first, second, and third input devices. As will be described below, the first, second, and third input devices are configured to receive inputs from the operator of the sprayer for use in indexing the sprayer. For example, in one embodiment, the first, second, and third input devices may be configured as first, second, and third buttons positioned on the multi-function handle.

Additionally, a computing system of disclosed system is configured to turn sections of nozzles supported on the first and second boom arms on and off based on inputs received from the user interface. Specifically, in several embodiments, upon receipt of a first operator input from the first input device (e.g., when the first button is depressed), the computing system controls the operation of the first plurality of valves to one of sequentially turn on or turn off the first plurality of sections of nozzles. Moreover, upon receipt of a second operator input from the second input device (e.g., when the second button is depressed), the computing system controls the operation of the second plurality of valves to one of sequentially turn on or turn off the second plurality of sections of nozzles. In addition, upon simultaneous receipt of the first operator input from the first input device and a third operator input from the third input device (e.g., when the first and third buttons are simultaneously depressed), the computing system controls the operation of the first plurality of valves to the other of sequentially turn on or turn off the first plurality of sections of nozzles. Furthermore, upon simultaneous receipt of the second operator input from second input device and a third operator input from the third input device (e.g., when the second and third buttons are simultaneously depressed), the computing system controls the operation of the second plurality of valves to the other of sequentially turn on or turn off the second plurality of sections of nozzles.

The disclosed system improves the operation of the agricultural sprayer. As mentioned above, many current systems for indexing sections of nozzles on an agricultural sprayer rely on numerous input devices (e.g., five buttons), which reduce the available space on the user interface for other input devices to control other functions of the sprayer. Other current systems having fewer input devices to control indexing of the sprayer rely on operator input device configurations that can be difficult for the operator to manipulate accurately (particularly when acting quickly), such as a rotary wheel(s) that is rotated in one direction to turn sections of nozzles on and rotated in the opposite section to turn sections of nozzles off. However, it is easy for operators to rotate such rotary devices too far, thereby turning on or off too many sections of nozzles. However, as described above, with the disclosed system, three input devices are used to control indexing of the sections of nozzles of the sprayer. Such a configuration frees up space on the user interface for other input devices to control other functions of the sprayer. Moreover, by using three input devices as described above, it is easier for the operator to quickly and accurately turn on and/or off the desired number of sections of nozzles.

Figure 2:
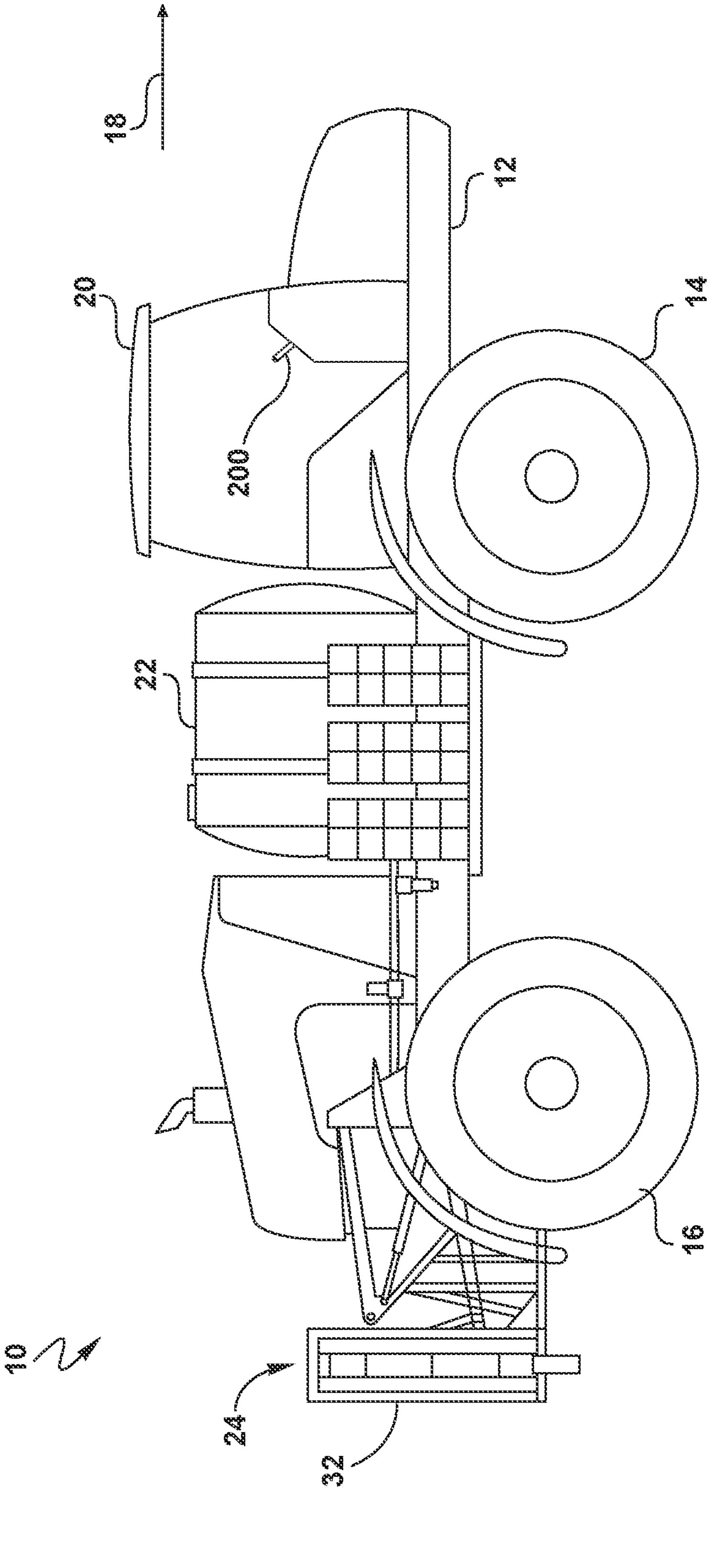
FIG. 2 illustrates a side view of the agricultural sprayer shown in FIG. 1, particularly illustrating a user interface positioned within a cab of the agricultural sprayer.

Referring now to the drawings, FIGS. 1 and 2 illustrate differing views of one embodiment of an agricultural sprayer 10. Specifically, FIG. 1 illustrates a perspective view of the agricultural sprayer 10. Additionally, FIG. 2 illustrates a side of the agricultural sprayer 10.

In the illustrated embodiment, the agricultural sprayer 10 is configured as a self-propelled agricultural sprayer. However, in alternative embodiments, the agricultural sprayer 10 may be configured as any other suitable agricultural vehicle that dispenses an agricultural fluid (e.g., a pesticide or a nutrient) while traveling across a field, such as an agricultural tractor and an associated implement (e.g., a towable sprayer, an inter-seeder, a side-dresser, and/or the like).

As shown in FIGS. 1 and 2, the agricultural sprayer 10 includes a chassis 12 configured to support or couple to a plurality of components. For example, a pair of steerable front wheels 14 and a pair of driven rear wheels 16 may be coupled to the chassis 12. The wheels 14, 16 may be configured to support the agricultural sprayer 10 relative to the ground and move the sprayer 10 in a travel direction 18 across the field. Furthermore, the chassis 12 may support a cab 20 in which one or more devices for controlling the agricultural sprayer 10 are located. For example, as particularly shown in FIG. 2, a user interface 200 (e.g., a multi-function handle) positioned within cab 20. Additionally, the chassis 12 may support an agricultural fluid tank 22 configured to store or hold an agricultural fluid, such as a pesticide (e.g., a herbicide, an insecticide, a rodenticide, and/or the like), a fertilizer, or a nutrient. However, in alternative embodiments, the sprayer 10 may have any other suitable configuration. For example, in one embodiment, the front wheels 14 of the sprayer 10 may be driven in addition to or in lieu of the rear wheels 16.

Additionally, the sprayer 10 may include a boom assembly 24 mounted on the chassis 12. In general, the boom assembly 24 may extend in a lateral direction 26 between a first outer lateral end 28 and a second outer lateral end 30, with the lateral direction 26 extending perpendicular to the travel direction 18. In several embodiments, the boom assembly 24 may include a frame 32 and a pair of boom arms 34, 36. As shown in FIG. 1, a first boom arm 34 extends outwardly in the lateral direction 26 from a first inner lateral end 38 that is coupled to a first side 39 of the frame 32 to the first outer lateral end 28. Similarly, a second boom arm 36 extends outwardly in the lateral direction 26 from a second inner lateral end 40 that is coupled to an opposing, second side 41 the frame 32 to the second outer lateral end 30. However, in alternative embodiments, the boom assembly 24 may have any other suitable configuration.

Furthermore, a plurality of nozzles 42 are supported on the boom assembly 24. Each nozzle 42 is, in turn, configured to dispense the agricultural fluid stored in the tank 22 onto the underlying field (e.g., the underlying field/soil surface and/or the underlying crop canopy). The nozzles 42 are generally grouped and controlled in sections. More specifically, as shown in FIG. 1, a first plurality of sections of nozzles 42A is supported on the first boom arm 34. For example, in the illustrated embodiment, a first section 44A of nozzles 42 is supported on the first boom arm 34 adjacent to the first outer lateral end 28, a second section 44B of nozzles 42 is supported on the first boom arm 34 inward from the first section 44A of nozzles 42 along the lateral direction 26, and a third section 44C of nozzles 42 is supported on the first boom arm 34 adjacent to the first inner lateral end 38 and inward from the second section 44B of nozzles 42 along the lateral direction 26. Additionally, as shown in FIG. 1, a second plurality of sections of nozzles 42B is supported on the second boom arm 36. For example, in the illustrated embodiment, a first section 46A of nozzles 42 is supported on the second boom arm 36 adjacent to the second outer lateral end 30, a second section 46B of nozzles 42 is supported on the second boom arm 36 inward from the first section 46A of nozzles 42 along the lateral direction 26, and a third section 46C of nozzles 42 is supported on the second boom arm 36 adjacent to the second inner lateral end 40 and inward from the second section 46B of nozzles 42 along the lateral direction 26. As will be described below, the operator of the agricultural sprayer 10 may use the user interface 200 to sequentially turn on and off the various sections 44A-C, 46A-C of the nozzles 42 during operation. However, in alternative embodiments, the nozzles 42 may be grouped in any other suitable manner, such as in any other suitable number of sections.

It should be further appreciated that the configuration of the agricultural sprayer 10 described above and shown in FIGS. 1 and 2 is provided only to place the present subject matter in an exemplary field of use. Thus, it should be appreciated that the present subject matter may be readily adaptable to any manner of agricultural sprayer configuration.

Figure 3:
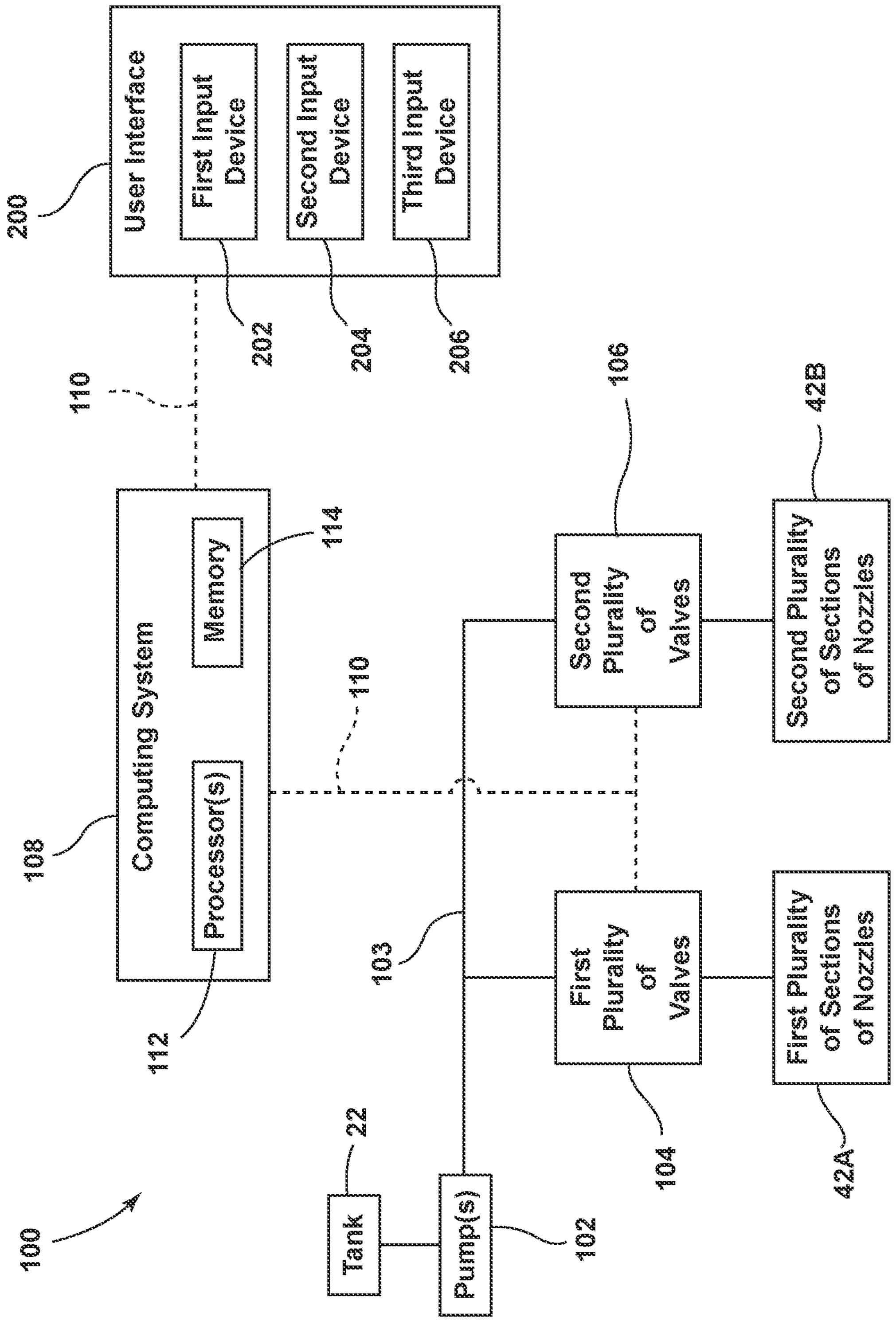
FIG. 3 illustrates a schematic view of one embodiment of a system for indexing sections of nozzles on an agricultural sprayer in accordance with aspects of the present subject matter.

Referring now to FIG. 3, a schematic view of one embodiment of a system 100 for indexing sections of nozzles on an agricultural sprayer is illustrated in accordance with aspects of the present subject matter. In general, the system 100 will be described herein with reference to the agricultural sprayer 10 described above with reference to FIGS. 1 and 2. However, it should be appreciated by those of ordinary skill in the art that the disclosed system 100 may generally be utilized with agricultural sprayers having any other suitable sprayer configuration.

As shown in FIG. 3, the system 100 includes various fluid components for supplying agricultural fluid from the tank 22 to the nozzles 42. For example, in some embodiments, the system 100 may include one or more pumps 102 configured to pump the agricultural fluid from the tank 22 to the nozzles 42 via supply conduits 103.

Furthermore, the system 100 includes various valves for controlling the flow of agricultural fluid from the tank 22 to the nozzles 42. Specifically, in several embodiments, the system 100 includes a first plurality of valves 104 configured to control the flow of agricultural fluid to the first plurality of sections of nozzles 42A mounted on the first boom arm 34. In this respect, by controlling the operation of the first plurality of valves 104, the first plurality of sections of nozzles 42A can be indexed or otherwise sequentially turned on and off. Additionally, in several embodiments, the system 100 includes a second plurality of valves 106 configured to control the flow of agricultural fluid to the second plurality of sections of nozzles 42B mounted on the second boom arm 36. As such, by controlling the operation of the second plurality of valves 106, the second plurality of sections of nozzles 42B can be indexed or otherwise sequentially turned on and off. However, in alternative embodiments, the system 100 may include any other suitable valves or groups of valves to the flow of agricultural fluid to the nozzles 42.

Moreover, the system 100 includes the user interface 200 of the agricultural sprayer 10. In general, the user interface 200 is configured to receive inputs from the operator of the agricultural sprayer 10 for indexing or otherwise sequentially turning on and/or off sections of the nozzles 42 of the sprayer 10. Specifically, the user interface 200 includes a first input device 202 configured to receive a first operator input from the operator of the sprayer 10. Furthermore, the user interface 200 includes a second input device 204 configured to receive a second operator input from the operator of the sprayer 10. Additionally, the user interface 200 includes a third input device 206 configured to receive a third and fourth operator inputs from the operator of the sprayer 10. As will be described below, the various sections of nozzles 42 supported on the first and second boom arms 34, 36 are turned on and off based on the inputs received by the first, second, and third input devices 202, 204, 206.

Figure 4:
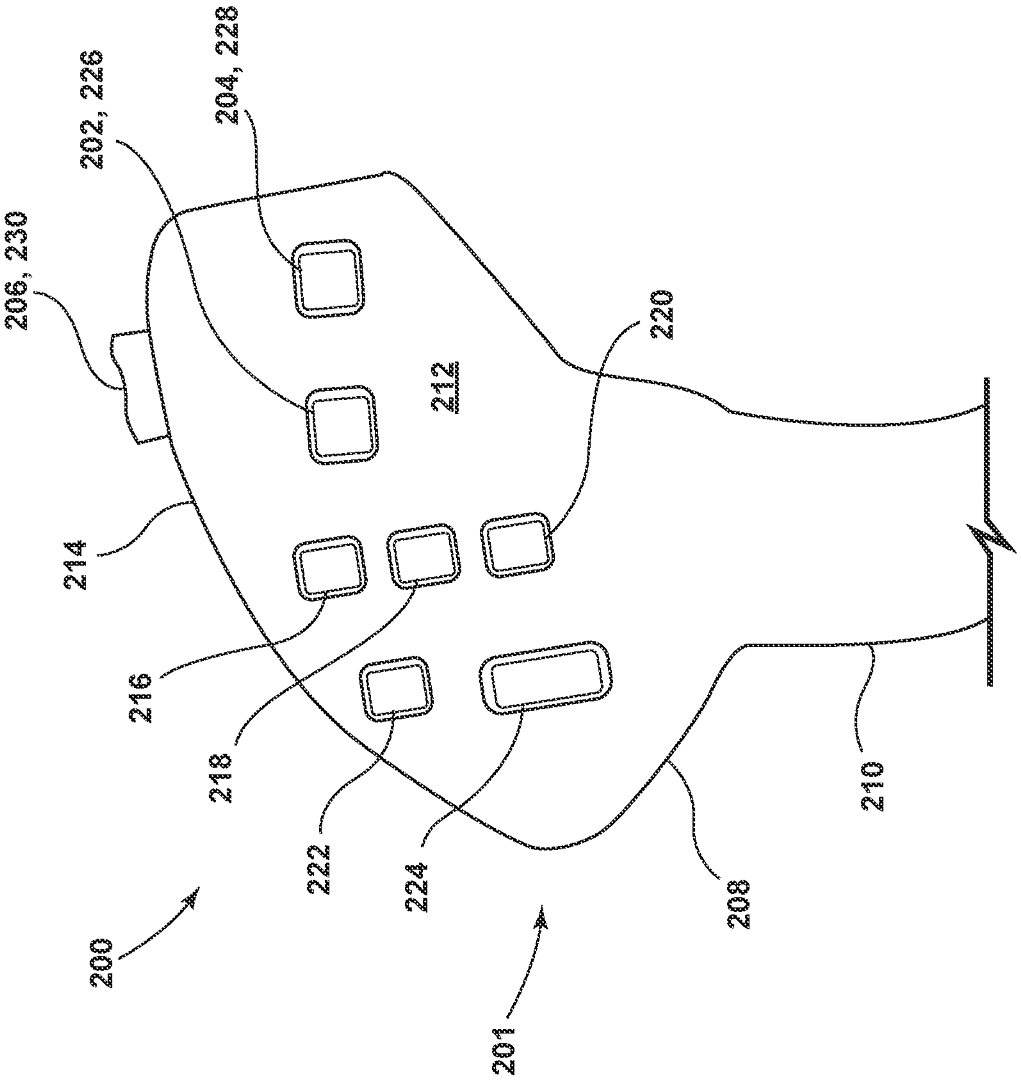
FIG. 4 illustrates a front view of one embodiment of user interface of an agricultural sprayer in accordance with aspects of the present subject matter.

The user interface 200 may have suitable configuration and/or be positioned at any suitable location. For example, as illustrated in FIG. 4, in some embodiments, the user interface 200 is configured as a multi-function handle 201 positioned within the cab 20 of the sprayer 10. The multi-function handle 201 may, in turn, include a grip portion 208 and a shaft 210 (e.g., may be joystick-like or lever-like) and may allow the operator to control several different functions of the sprayer 10, including indexing of the sprayer 10. As such, in one embodiment, the first and second input devices 202, 204 are positioned on a first surface 212 (e.g., a front surface) of the grip portion 208, while the third input device 206 is positioned on a second surface 214 (e.g., a top or rear surface) of the grip portion 208. However, the first, second, and/or third input devices 202, 204, 206 may be positioned at any other suitable locations of the user interface 200. Additionally, the multi-function handle 201 may include other input devices, such as input devices 216, 218, 220, 222, 224, to control other functions or operations of the sprayer 10.

The first, second, and third input devices 202, 204, 206 may be configured as any suitable type of input devices. For example, in several embodiments, the first, second, and third input devices 202, 204, 206 may respectively be configured as first, second, and third buttons 226, 228, 230. In such embodiments, the operator may provide the first operator input to the first button 226 by depressing the first button 226. Moreover, in such embodiments, the operator may provide the second operator input to the second button 228 by depressing the second button 228. In addition, in such embodiments, the operator may provide the third and fourth operator inputs to the third button 230 by depressing the third button 230. However, in alternative embodiments, the first, second, and third input devices 202, 204, 206 may have any other suitable configuration.

Referring again to FIG. 3, the system 100 also includes a computing system 108 communicatively coupled to one or more components of the agricultural sprayer 10 and/or the system 100 to allow the operation of such components to be electronically or automatically controlled by the computing system 108. For instance, the computing system 108 may be communicatively coupled to the user interface 200 and, more specifically, the first, second, and third input devices 202, 204, 206 via a communicative link 110. As such, the computing system 108 may be configured to receive operator inputs from the first, second, and third input devices 202, 204, 206 for use in indexing or otherwise sequentially turning on and/or off sections of the nozzles 42 of the sprayer 10. Furthermore, the computing system 108 may be communicatively coupled to the first and second pluralities of valves 104, 106 via the communicative link 110. In this respect, the computing system 108 may be configured to control the operation of the first and second pluralities of valves 104, 106 to index or otherwise sequentially turn on and/or off sections of the nozzles 42 of the sprayer 10. In addition, the computing system 108 may be communicatively coupled to any other suitable components of the agricultural sprayer 10 and/or the system 100.

In general, the computing system 108 may comprise one or more processor-based devices, such as a given controller or computing device or any suitable combination of controllers or computing devices. Thus, in several embodiments, the computing system 108 may include one or more processor(s) 112 and associated memory device(s) 114 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 114 of the computing system 108 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 114 may generally be configured to store suitable computer-readable instructions that, when implemented by the processor(s) 112, configure the computing system 108 to perform various computer-implemented functions, such as one or more aspects of the algorithms that will be described herein. In addition, the computing system 108 may also include various other suitable components, such as a communications circuit or module, one or more input/output channels, a data/control bus and/or the like.

The various functions of the computing system 108 may be performed by a single processor-based device or may be distributed across any number of processor-based devices, in which instance such devices may be considered to form part of the computing system 108. For instance, the functions of the computing system 108 may be distributed across multiple application-specific controllers or computing devices, such as a spray controller, a navigation controller, an engine controller, a transmission controller, and/or the like.

As mentioned above, the computing system 108 is configured to control the operation of the first and second pluralities of valves 104, 106 based on operator inputs received from the user interface 200. Specifically, in several embodiments, the computing system 108 is configured to receive the first operator input from the first input device 202. Upon receipt of the first operator input, the computing system 108 is configured to control the operation of the first plurality of valves 104 to one of sequentially turn on or turn off the first plurality of sections of nozzles 42A. Furthermore, the computing system 108 is configured to receive the second operator input from the second input device 204. Upon receipt of the second operator input, the computing system 108 is configured to control the operation of the second plurality of valves 106 to one of sequentially turn on or turn off the second plurality of sections of nozzles 42B. Additionally, the computing system 108 is configured to simultaneously receive the first operator input from the first input device 202 and the third input from the third input device 206. Upon simultaneous receipt of the first and third operator inputs, the computing system 108 is configured to control the operation of the first plurality of valves 104 to the other of sequentially turn on or turn off the first plurality of sections of nozzles 42A. Moreover, the computing system 108 is configured to simultaneously receive the second operator input from the second input device 204 and the third input from the third input device 206. Upon simultaneous receipt of the second and third operator inputs, the computing system 108 is configured to control the operation of the second plurality of valves 106 to the other of sequentially turn on or turn off the second plurality of sections of nozzles 42B. In addition, the computing system 108 is configured to receive a fourth input from the third input device 206 within a predetermined time period after receiving the third input from the third input device 206. Upon receipt of the fourth input within the predetermined time period, the computing system 108 is configured to control the operation of the first plurality of valves 104 and the second plurality of valves 106 to turn on all of the first plurality of sections of nozzles 42A and all of the second plurality of sections of nozzles 42B. In this respect, by interacting with the first, second, and third operator input devices 202, 204, 206 in particular manners, the operator can index or otherwise sequentially turn on and/or off sections of the nozzles 42 of the sprayer 10, such as during spraying operations.

Figure 5:
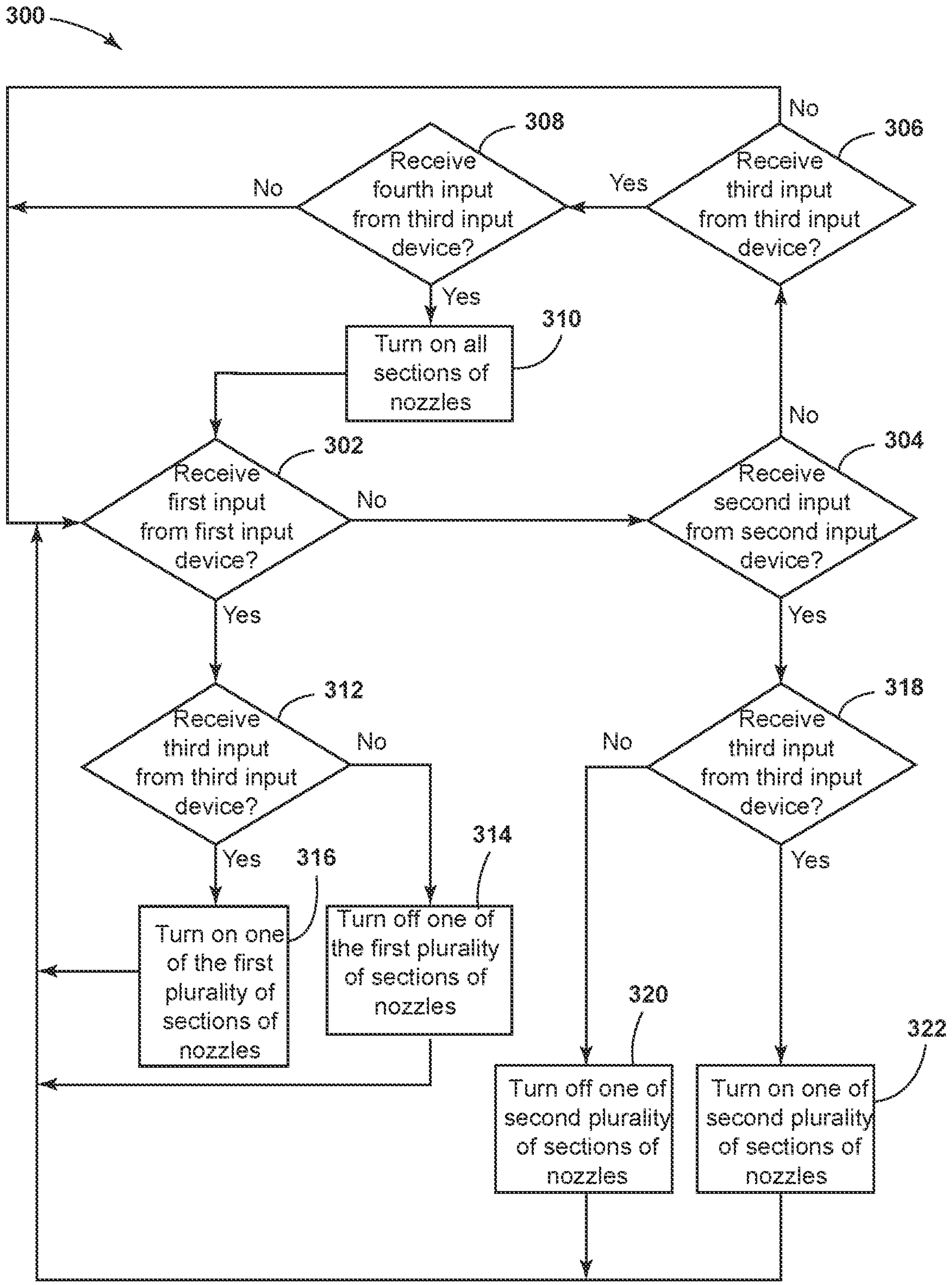
FIG. 5 illustrates a flow diagram providing one embodiment of control logic for indexing sections of nozzles on an agricultural sprayer in accordance with aspects of the present subject matter.

Referring now to FIG. 5, a flow diagram of one embodiment of example control logic 300 that may be executed by the computing system 108 (or any other suitable computing system) for indexing sections of nozzles on an agricultural sprayer is illustrated in accordance with aspects of the present subject matter. Specifically, the control logic 300 shown in FIG. 5 is representative of steps of one embodiment of an algorithm that can be executed to index sections of nozzles on an agricultural sprayer in a manner that reduces the number of input devices needed on the user interface, while still allowing for quick and accurate control of the indexing operation. Thus, in several embodiments, the control logic 300 may be advantageously utilized in association with a system installed on or forming part of an agricultural sprayer to allow for real-time indexing sections of nozzles on the sprayer without requiring substantial computing resources and/or processing time. However, in other embodiments, the control logic 300 may be used in association with any other suitable system, application, and/or the like for indexing sections of nozzles on an agricultural sprayer.

As shown, at (302), the control logic 300 includes determining when a first operator input is received from a first input device. Specifically, as mentioned above, in several embodiments, the computing system 108 is communicatively coupled to the first input device 202 of the user interface 200. In this respect, during operation of the agricultural sprayer 10, the computing system 108 is configured to determine when a first operator input is received from the first input device 202. For example, in one embodiment, the computing system 108 determines when the operator has depressed the first button 226 on the multi-function handle 201. When no first operator input is received from the first input device 202 (thereby indicating the operator does not want to turn on or off any sections of nozzles 42 on the first boom arm 34), the control logic 300 proceeds to (304). Conversely, when a first operator input is received from the first input device 202 (thereby indicating the operator would like to turn on or off a section of nozzles 42 on the first boom arm 34), the control logic 300 proceeds to (312).

Furthermore, at (302), the control logic 300 includes determining when a second operator input is received from a second input device. Specifically, as mentioned above, in several embodiments, the computing system 108 is communicatively coupled to the second input device 204 of the user interface 200. In this respect, after determining that no first operator input was received at (302), the computing system 108 is configured to determine when a second operator input is received from the second input device 204. For example, in one embodiment, the computing system 108 determines when the operator has depressed the second button 228 on the multi-function handle 201. When no second operator input is received from the second input device 204 (thereby indicating the operator does not want to turn on or off any sections of nozzles 42 on the second boom arm 36), the control logic 300 proceeds to (306). Conversely, when a second operator input is received from the second input device 204 (thereby indicating the operator would like to turn on or off a section of nozzles 42 on the second boom arm 36), the control logic 300 proceeds to (318).

Additionally, at (306), the control logic 300 includes determining when a third operator input is received from a third input device. Specifically, as mentioned above, in several embodiments, the computing system 108 is communicatively coupled to the third input device 206 of the user interface 200. In this respect, after determining that no second operator input was received at (304), the computing system 108 is configured to determine when a third operator input is received from the third input device 206. For example, in one embodiment, the computing system 108 determines when the operator has depressed the third button 230 on the multi-function handle 201. When no third operator input is received from the second input device 204, the control logic 300 returns to (302). Conversely, when a third operator input is received from the third input device 206, the control logic 300 proceeds to (308).

Moreover, at (308), the control logic 300 includes determining when a fourth operator input is received from a third input device within a predetermined time period after receiving the third input from the third input device. Specifically, in several embodiments, after determining that a third operator input was received at (306), the computing system 108 is configured to determine when a fourth operator input is received from the third input device 206 within a predetermined time period after receiving the third input from the third input device 206 at (306). For example, in one embodiment, the computing system 108 determines when the operator has depressed the third button 230 on the multi-function handle 201 a second time within the predetermined time period. When no fourth operator input is received from the third input device 206 (thereby indicating the operator does not want to turn on all sections of nozzles 42 on the first and second boom arms 34, 36), the control logic 300 returns to (302). Conversely, when a fourth operator input is received from the third input device 206 within a predetermined time period after receiving the third input from the third input device 206 (thereby indicating the operator would like to turn on all sections of nozzles 42 on the first and second boom arms 34, 36), the control logic 300 proceeds to (310).

In addition, at (310), the control logic 300 includes controlling the operation of a first plurality of valves and a second plurality of valves to turn on all of a first plurality of sections of nozzles and all of a second plurality of sections of nozzles. Specifically, as mentioned above, in several embodiments, the computing system 108 is communicatively coupled to the first and second pluralities of valves 104, 106 via the communicative link 110. As such, upon receipt of the fourth input within the predetermined time period at (308), the computing system 108 is configured to control the operation of the first plurality of valves 104 and the second plurality of valves 106 to turn on all of the first plurality of sections of nozzles 42A and all of the second plurality of sections of nozzles 42B that are not already on. For example, in one embodiment, the computing system 108 may transmit control signals to the first and second pluralities of valves 104 via the communicative link 110. Such control signals may, in turn, instruct the first and second pluralities of valves 104 to turn on the flow of agricultural fluid from the tank 22 to any sections of nozzles 42 that are not already on. Upon completion of (310), the control logic 300 returns to (302).

As shown in FIG. 5, at (312), the control logic 300 includes determining when a third operator input is received from the third input device. Specifically, in several embodiments, when it is determined that a first operator input is being received at (302) (e.g., that the first button 226 is depressed), the computing system 108 is configured to determine when a third operator input is simultaneously received from the third input device 206. For example, in one embodiment, the computing system 108 determines when the operator has simultaneously depressed the first and third buttons 226, 230 on the multi-function handle 201. When no third operator input is simultaneously received from the third input device 206 (thereby indicating that the operator would like to turn off one of the sections of the nozzles 42 on the first boom arm 34), the control logic 300 proceeds to (314). Conversely, when first and third operator inputs are simultaneously received from the first and third input devices 202, 206 (thereby indicating that the operator would like to turn on one of the sections of the nozzles 42 on the first boom arm 34), the control logic 300 proceeds to (316).

Furthermore, at (314), the control logic 300 includes controlling the operation of the first plurality of valves to turn off one of the sections of the first plurality of sections of nozzles. Specifically, in several embodiments, upon receipt of the first operator input at (302) and no third operator input at (312), the computing system 108 is configured to control the operation of the first plurality of valves 104 to turn off one of the sections of the first plurality of sections of nozzles 42A supported on the first boom arm 34. For example, in one embodiment, the computing system 108 may transmit control signals to the first plurality of valves 104 via the communicative link 110. Such control signals may, in turn, instruct the first plurality of valves 104 to turn off the flow of agricultural fluid from the tank 22 to one of the sections of the nozzles 42 on the first boom arm 34. Subsequent receipt of another first operator input at (302) and no third operator input at (312) results in turning off another section of the nozzles 42 and so on. Upon completion of (314), the control logic 300 returns to (302).

In some embodiments, the first plurality of sections of nozzles 42A is turned off sequentially, such as from the first outer lateral end 28 to the first inner lateral end 38. For example, assume that, at a given time, the first section 44A of nozzles 42 is turned off and the second and third sections 44B, 44C are turned on. In such embodiments, when the first operator input is received at the given time and no third operator input is received at the given time, the computing system 108 would control the operation of the first plurality of valves 104 such that the second section 44B of the nozzles 42 is turned off. Subsequent receipt of another first operator input and no third operator input would turn off the first section 44A of the nozzles 42 off.

Additionally, at (316), the control logic 300 includes controlling the operation of the first plurality of valves to turn on one of the sections of the first plurality of sections of nozzles. Specifically, in several embodiments, upon receipt of the first operator input at (302) and the third operator input at (312), the computing system 108 is configured to control the operation of the first plurality of valves 104 to turn on one of the sections of the first plurality of sections of nozzles 42A supported on the first boom arm 34. For example, in one embodiment, the computing system 108 may transmit control signals to the first plurality of valves 104 via the communicative link 110. Such control signals may, in turn, instruct the first plurality of valves 104 to turn on the flow of agricultural fluid from the tank 22 to one of the sections of the nozzles 42 on the first boom arm 34. Subsequent receipt of another first operator input at (302) and the third operator input at (312) results in turning on another section of the nozzles 42 and so on. Upon completion of (316), the control logic 300 returns to (302).

In some embodiments, the first plurality of sections of nozzles 42A is turned on sequentially, such as from the first inner lateral end 38 to the first outer lateral end 28. For example, assume that, at a given time, the first and second sections 44A, 44B of nozzles 42 are turned off and the third section 44C is turned on. In such embodiments, when the first and third operator inputs are simultaneously received at the given time, the computing system 108 would control the operation of the first plurality of valves 104 such that the second section 44B of the nozzles 42 is turned on. Subsequent simultaneous receipt of another first and third operator input would turn on the first section 44A of the nozzles 42 on.

As shown in FIG. 5, at (318), the control logic 300 includes determining when a third operator input is received from the third input device. Specifically, in several embodiments, when it is determined that a second operator input is being received at (304) (e.g., that the second button 226 is depressed), the computing system 108 is configured to determine when a third operator input is simultaneously received from the third input device 206. For example, in one embodiment, the computing system 108 determines when the operator has simultaneously depressed the second and third buttons 228, 230 on the multi-function handle 201. When no third operator input is simultaneously received from the third input device 206 (thereby indicating that the operator would like to turn off one of the sections of the nozzles 42 on the second boom arm 36), the control logic 300 proceeds to (320). Conversely, when second and third operator inputs are simultaneously received from the second and third input devices 204, 206 (thereby indicating that the operator would like to turn off one of the sections of the nozzles 42 on the second boom arm 36), the control logic 300 proceeds to (322).

Furthermore, at (320), the control logic 300 includes controlling the operation of the second plurality of valves to turn off one of the sections of the second plurality of sections of nozzles. Specifically, in several embodiments, upon receipt of the second operator input at (304) and no third operator input at (318), the computing system 108 is configured to control the operation of the second plurality of valves 106 to turn off one of the sections of the second plurality of sections of nozzles 42B supported on the second boom arm 36. For example, in one embodiment, the computing system 108 may transmit control signals to the second plurality of valves 106 via the communicative link 110. Such control signals may, in turn, instruct the second plurality of valves 106 to turn off the flow of agricultural fluid from the tank 22 to one of the sections of the nozzles 42 on the second boom arm 36. Subsequent receipt of another second operator input at (304) and no third operator input at (318) results in turning off another section of the nozzles 42 and so on. Upon completion of (320), the control logic 300 returns to (302).

In some embodiments, the second plurality of sections of nozzles 42B is turned off sequentially, such as from the second outer lateral end 30 to the second inner lateral end 40. For example, assume that, at a given time, the first section 46A of nozzles 42 is turned off and the second and third sections 46B, 44C are turned on. In such embodiments, when the second operator input is received at the given time and no third operator input is received at the given time, the computing system 108 would control the operation of the second plurality of valves 106 such that the second section 46B of the nozzles 42 is turned off. Subsequent receipt of another second operator input and no third operator input would turn off the first section 46A of the nozzles 42.

Additionally, at (322), the control logic 300 includes controlling the operation of the second plurality of valves to turn on one of the sections of the second plurality of sections of nozzles. Specifically, in several embodiments, upon receipt of the second operator input at (304) and the third operator input at (318), the computing system 108 is configured to control the operation of the second plurality of valves 106 to turn on one of the sections of the second plurality of sections of nozzles 42B supported on the second boom arm 36. For example, in one embodiment, the computing system 108 may transmit control signals to the second plurality of valves 106 via the communicative link 110. Such control signals may, in turn, instruct the second plurality of valves 106 to turn on the flow of agricultural fluid from the tank 22 to one of the sections of the nozzles 42 on the second boom arm 36. Subsequent receipt of another second operator input at (304) and third operator input at (318) results in turning on another section of the nozzles 42 and so on. Upon completion of (322), the control logic 300 returns to (302).

In some embodiments, the second plurality of sections of nozzles 42B is turned on sequentially, such as from the second inner lateral end 40 to the second outer lateral end 30. For example, assume that, at a given time, the first and second sections 46A, 46B of nozzles 42 are turned off and the third section 46C is turned on. In such embodiments, when the second and third operator inputs are simultaneously received at the given time, the computing system 108 would control the operation of the second plurality of valves 106 such that the second section 46B of the nozzles 42 is turned on. Subsequent simultaneous receipt of another second and third operator input would turn on the first section 46A of the nozzles 42.

It is to be understood that the steps of the control logic 300 are performed by the computing system 108 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 108 described herein, such as the control logic 300, is implemented in software code or instructions which are tangibly stored on a tangible computer readable medium. The computing system 108 loads the software code or instructions via a direct interface with the computer readable medium or via a wired and/or wireless network. Upon loading and executing such software code or instructions by the computing system 108, the computing system 108 may perform any of the functionality of the computing system 108 described herein, including any steps of the control logic 300 and described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural sprayer, comprising:
- a frame,
- a first boom arm supported on the frame;
- a first plurality of sections of nozzles supported on the first boom arm;
- a first plurality of valves configured to control a flow of agricultural fluid to the first plurality of sections of nozzles;
- a second boom arm supported on the frame;
- a second plurality of sections of nozzles supported on the second boom arm;
- a second plurality of valves configured to control the flow of the agricultural fluid to the second plurality of sections of nozzles;
- a user interface including a first input device, a second input device, and a third input device; and
- a computing system communicatively coupled to the user interface, the computing system configured to:
  - receive a first operator input from the first input device;
  - upon receipt of the first operator input, control an operation of the first plurality of valves to one of sequentially turn on or turn off the first plurality of sections of nozzles;
  - receive a second operator input from the second input device;
  - upon receipt of the second operator input, control an operation of the second plurality of valves to one of sequentially turn on or turn off the second plurality of sections of nozzles;
  - simultaneously receive the first operator input from the first input device and a third input from the third input device;
  - upon simultaneous receipt of the first and third operator inputs, control the operation of the first plurality of valves to the other of sequentially turn on or turn off the first plurality of sections of nozzles;
  - simultaneously receive the second operator input from the second input device and the third input from the third input device;
  - upon simultaneous receipt of the second and third operator inputs, control the operation of the second plurality of valves to the other of sequentially turn on or turn off the second plurality of sections of nozzles;
  - receive a fourth input from the third input device within a predetermined time period after receiving the third input from the third input device;
  - upon receipt of the fourth input within the predetermined time period, control the operation of the first plurality of valves and the second plurality of valves to turn on all of the first plurality of sections of nozzles and all of the second plurality of sections of nozzles.

2. The agricultural sprayer of claim 1, wherein the computing system is further configured to:
- upon receipt of the first operator input, control the operation of the first plurality of valves to sequentially turn off the first plurality of sections of nozzles;

upon receipt of the second operator input, control the operation of the second plurality of valves to sequentially turn off the second plurality of sections of nozzles;

upon simultaneous receipt of the first and third operator inputs, control the operation of the first plurality of valves to sequentially turn on the first plurality of sections of nozzles;

upon simultaneous receipt of the second and third operator inputs, control the operation of the second plurality of valves to sequentially turn on the second plurality of sections of nozzles.

3. The agricultural sprayer of claim 2, wherein:

the first boom arm extends in a lateral direction from an inner lateral end to an outer lateral end;

the second boom arm extends in the lateral direction from an inner lateral end to an outer lateral end; and the computing system is further configured to:

upon receipt of the first operator input, control the operation of the first plurality of valves to sequentially turn off the first plurality of sections of nozzles from the outer lateral end of the first boom arm toward the inner lateral end of the first boom arm; and upon receipt of the second operator input, control the operation of the second plurality of valves to sequentially turn off the second plurality of sections of nozzles from the outer lateral end of the second boom arm toward the inner lateral end of the second boom arm.

4. The agricultural sprayer of claim 3, wherein the computing system is further configured to:

upon simultaneous receipt of the first and third operator inputs, control the operation of the first plurality of valves to sequentially turn on the first plurality of sections of nozzles from the inner lateral end of the first boom arm toward the outer lateral end of the first boom arm; and upon simultaneous receipt of the second and third operator inputs, control the operation of the second plurality of valves to sequentially turn on the second plurality of sections of nozzles from the inner lateral end of the second boom arm toward the outer lateral end of the second boom arm.

5. The agricultural sprayer of claim 3, wherein the first boom arm is mounted on a first side of the frame and the second boom arm is mounted on a second, opposed side of the frame.

6. The agricultural sprayer of claim 1, wherein the first input device comprises a first button, the second input device comprises a second button, the third input device comprises a third button.

7. The agricultural sprayer of claim 1, further comprising:

a cab supported on the frame, wherein the user interface is positioned within the cab.

8. The agricultural sprayer of claim 7, wherein the user interface comprises a multi-function handle positioned within the cab.

9. The agricultural sprayer of claim 8, wherein the first input device and the second input device are positioned on a first side of the multi-function handle and the third input device is positioned on a second side of the multi-function handle.

10. A system for indexing sections of nozzles on an agricultural sprayer, the system comprising:

a first boom arm;

a first plurality of sections of nozzles supported on the first boom arm;

a first plurality of valves configured to control a flow of agricultural fluid to the first plurality of sections of nozzles;

a second boom arm;

a second plurality of sections of nozzles supported on the second boom arm;

a second plurality of valves configured to control the flow of the agricultural fluid to the second plurality of sections of nozzles;

a user interface including a first input device, a second input device, and a third input device; and a computing system communicatively coupled to the user interface, the computing system configured to:

receive a first operator input from the first input device;

upon receipt of the first operator input, control an operation of the first plurality of valves to one of sequentially turn on or turn off the first plurality of sections of nozzles;

receive a second operator input from the second input device;

upon receipt of the second operator input, control an operation of the second plurality of valves to one of sequentially turn on or turn off the second plurality of sections of nozzles;

simultaneously receive the first operator input from the first input device and a third input from the third input device;

upon simultaneous receipt of the first and third operator inputs, control the operation of the first plurality of valves to the other of sequentially turn on or turn off the first plurality of sections of nozzles;

simultaneously receive the second operator input from the second input device and the third input from the third input device;

upon simultaneous receipt of the second and third operator inputs, control the operation of the second plurality of valves to the other of sequentially turn on or turn off the second plurality of sections of nozzles;

receive a fourth input from the third input device within a predetermined time period after receiving the third input from the third input device;

upon receipt of the fourth input within the predetermined time period, control the operation of the first plurality of valves and the second plurality of valves to turn on all of the first plurality of sections of nozzles and all of the second plurality of sections of nozzles.

11. The system of claim 10, wherein the computing system is further configured to:

upon receipt of the first operator input, control the operation of the first plurality of valves to sequentially turn off the first plurality of sections of nozzles;

upon receipt of the second operator input, control the operation of the second plurality of valves to sequentially turn off the second plurality of sections of nozzles;

upon simultaneous receipt of the first and third operator inputs, control the operation of the first plurality of valves to sequentially turn on the first plurality of sections of nozzles;

upon simultaneous receipt of the second and third operator inputs, control the operation of the second plurality of valves to sequentially turn on the second plurality of sections of nozzles.

12. The system of claim 11, wherein:
the first boom arm extends in a lateral direction from an inner lateral end to an outer lateral end;
the second boom arm extends in the lateral direction from an inner lateral end to an outer lateral end; and
the computing system is further configured to:
upon receipt of the first operator input, control the operation of the first plurality of valves to sequentially turn off the first plurality of sections of nozzles from the outer lateral end of the first boom arm toward the inner lateral end of the first boom arm; and
upon receipt of the second operator input, control the operation of the second plurality of valves to sequentially turn off the second plurality of sections of nozzles from the outer lateral end of the second boom arm toward the inner lateral end of the second boom arm.

13. The system of claim 12, wherein the computing system is further configured to:
upon simultaneous receipt of the first and third operator inputs, control the operation of the first plurality of valves to sequentially turn on the first plurality of sections of nozzles from the inner lateral end of the first boom arm toward the outer lateral end of the first boom arm; and
upon simultaneous receipt of the second and third operator inputs, control the operation of the second plurality of valves to sequentially turn on the second plurality of sections of nozzles from the inner lateral end of the second boom arm toward the outer lateral end of the second boom arm.

14. The system of claim 12, wherein the first boom arm is configured to be mounted on a first side of a frame of the agricultural sprayer and the second boom arm is configured to be mounted on a second, opposed side of the frame.

15. The system of claim 10, wherein the first input device comprises a first button, the second input device comprises a second button, the third input device comprises a third button.

16. The system of claim 10, wherein the user interface is configured to be positioned within a cab of the agricultural sprayer.

17. The system of claim 16, wherein the user interface comprises a multi-function handle.

18. The system of claim 17, wherein the first input device and the second input device are positioned on a first side of the multi-function handle and the third input device is positioned on a second side of the multi-function handle.

* * * * *